Patented June 24, 1930

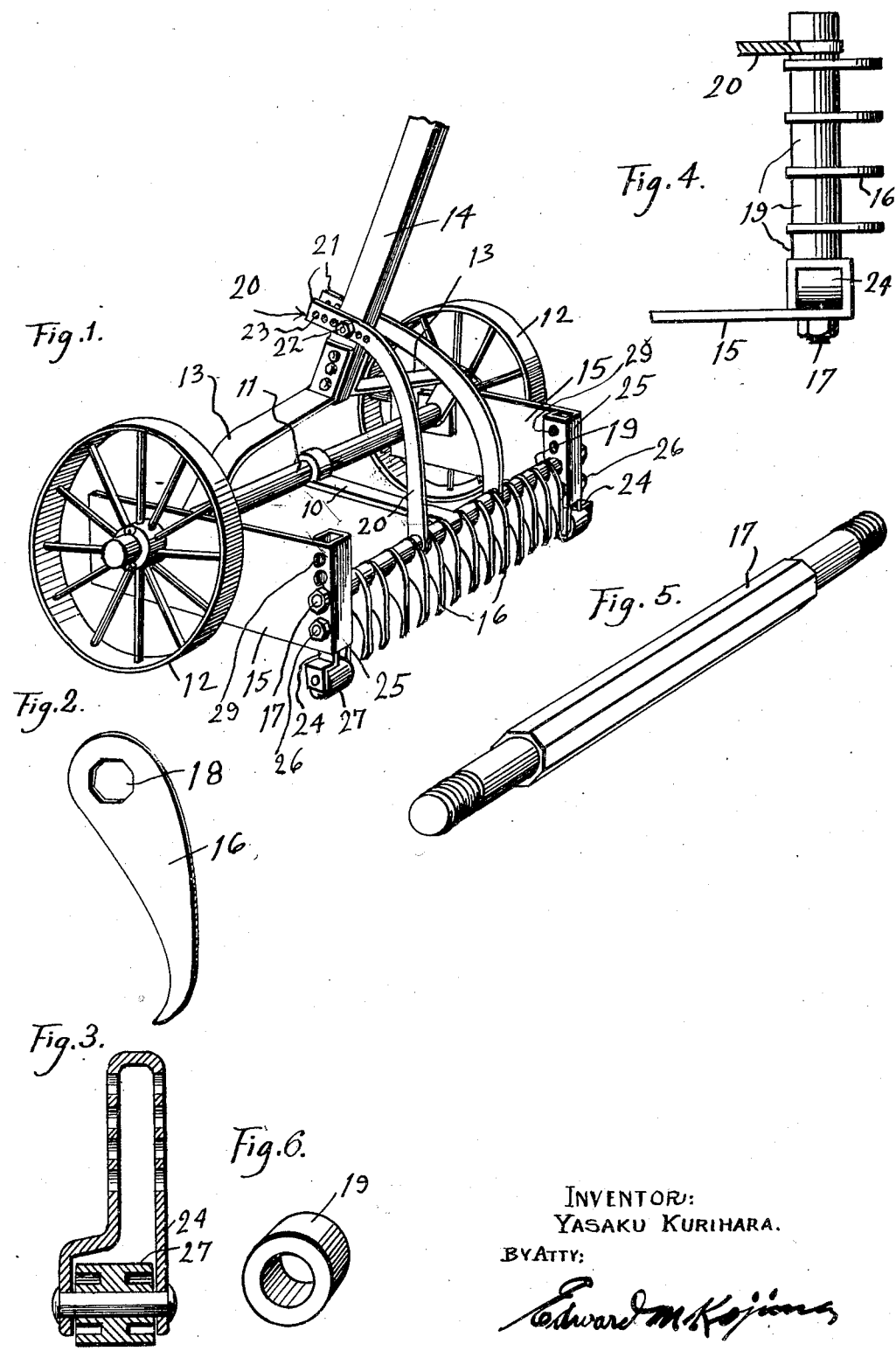

1,768,080

UNITED STATES PATENT OFFICE

YASAKU KURIHARA, OF LOS ANGELES, CALIFORNIA

LAWN RAKE

Application filed December 27, 1927. Serial No. 242,731.

This invention relates to an improved rake, which may be used for raking up cut grass, and for aerating and loosening the soil simultaneously with the raking operation.

An object of this invention is to provide a combined rake and soil-stirring device, of light construction, and which may be actuated by the operator as readily and conveniently as a lawn mower of equally light construction.

Another object is to provide detachable and interchangeable spacing elements for the teeth, whereby various designs of teeth, or of cutting implements may be substituted for one another.

Another object is to provide different means of adjustment for the rake teeth, or other cutting implements which may be mounted on the teeth supporting elements.

The preferred means by which I have accomplished the objects of my invention are illustrated in the accompanying drawings, and are hereinafter specifically described. That which I believe to be new is set forth in the annexed claims.

In the drawings, Figure 1 is a perspective view of my improved rake, with the handle portion broken away. Fig. 2 is a perspective detail view of a rake tooth as employed in my device. Fig. 3 is a sectional detail view of a supporting roller and the bracket member therefor. Fig. 4 is a fragmentary view showing a portion of the rake supporting elements. Fig. 5 is a perspective detail view of the rake-tooth supporting shaft. Fig. 6 is a perspective detail view of a spacing element which determines the position of the rake teeth.

In carrying out my invention, I provide a wheel shaft 11, having mounted thereon the wheels 12. The bars 13 are connected to shaft 11, and are secured to the handle 14. Frame members 15 are connected to and extend rearwardly from the wheel shaft 11. The rake teeth 16 are mounted on the supporting shaft 17, which is of an octagonal form to hold the teeth in their operative position. The rake teeth have corresponding holes 18 through which the shaft 17 extends. To maintain the teeth in spaced relation, I provide spacing elements 19, positioned between adjacent teeth. A brace 10 connects shafts 11 and 17, and, with shafts 11 and 17, and frame members 15, comprise a frame for supporting the rake teeth 16 in their operative position.

To adjust the teeth to bring the points of the teeth in proper relation to the ground, I provide the brackets 20, which are fixed to the supporting bar 17, and have their opposite ends 21, connected to handle 14, by bolts 22. The ends 21, are provided with a series of holes 23 for adjustment. The brackets 24, are adjustable in the box-like extremities 25, of frame members 15, and are secured by bolts 26, passing through brackets 24, and extremities 25. Brackets 24, have mounted thereon, the rollers 27. The rollers 27 may be therefore, adjusted to provide for depth of cut of the rake teeth. The rake teeth and their supporting bar 17, together with the spacing elements 19, are all clamped in position by nuts 28, on the ends of bar 17. The frame portions 25, are provided with a series of holes 29, for proper adjustment of the device.

In devices for use on a lawn, it is an advantage to push them instead of pulling them, as they will work easier and the operator can always see them work. I have therefore provided the wheels 12 and rollers 27, whereby my improved rake may be manipulated as easily and readily as the ordinary lawn implements. The handle, a portion of which is shown, is similar to the ordinary lawn-mower handle.

What is claimed is:

1. In a lawn rake, a frame including a wheel shaft, a rake shaft, and frame members connected thereto, wheels supporting the frame relative to the ground, a handle extending from the frame, brackets adjustable relative to and supporting the frame, rake teeth mounted on the rake shaft, spacing members interposed between adjacent rake teeth, and clamping means serving to retain the frame, rake shaft, rake teeth, and spacing elements in assembled form.

2. In a lawn rake, the combination with a frame including a wheel shaft, a rake shaft, and end frame members connected to the wheel and rake shafts, of a handle extending from the frame, means for adjusting the handle in angular positions relative to the frame, rake teeth mounted on the rake shaft, spacing members interposed between adjacent rake teeth, brackets adjustable vertically relative to the frame, rollers mounted on the extremities of the brackets, and wheels mounted on the wheel shaft and supporting the frame relative to the ground.

In testimony whereof, I hereunto affix my signature.

YASAKU KURIHARA.